United States Patent
Watanabe et al.

(10) Patent No.: US 10,445,894 B2
(45) Date of Patent: Oct. 15, 2019

(54) NON-CONTACT 3D MEASURING SYSTEM

(71) Applicant: MITUTOYO CORPORATION, Kawasaki, Kanagawa (JP)

(72) Inventors: Yutaka Watanabe, Kawasaki (JP); Hiraku Ishiyama, Kawasaki (JP)

(73) Assignee: MITUTOYO CORPORATION, Kawasaki (JP)

( * ) Notice: Subject to any disclaimer, the term of this patent is extended or adjusted under 35 U.S.C. 154(b) by 244 days.

(21) Appl. No.: 15/498,577

(22) Filed: Apr. 27, 2017

(65) Prior Publication Data
US 2017/0330340 A1    Nov. 16, 2017

(30) Foreign Application Priority Data
May 11, 2016    (JP) .................. 2016-095682

(51) Int. Cl.
| | |
|---|---|
| G06T 7/571 | (2017.01) |
| G06T 7/536 | (2017.01) |
| G06T 7/30 | (2017.01) |
| G06T 7/557 | (2017.01) |
| G06T 3/40 | (2006.01) |
| G06T 7/521 | (2017.01) |

(52) U.S. Cl.
CPC ............ *G06T 7/571* (2017.01); *G06T 3/4007* (2013.01); *G06T 7/30* (2017.01); *G06T 7/521* (2017.01); *G06T 7/536* (2017.01); *G06T 7/557* (2017.01); *G06T 2207/10004* (2013.01); *G06T 2207/10028* (2013.01); *G06T 2207/10056* (2013.01); *G06T 2207/20221* (2013.01)

(58) Field of Classification Search
CPC ........... G06T 19/20; G06T 7/571; G06T 7/30; G06K 9/46
See application file for complete search history.

(56) References Cited

U.S. PATENT DOCUMENTS

| | | | | |
|---|---|---|---|---|
| 3,095,475 A | * | 6/1963 | Brake ...................... | H04N 5/72 348/833 |
| 3,128,374 A | * | 4/1964 | McKelvie .......... | G05B 19/4103 318/571 |
| 5,175,616 A | * | 12/1992 | Milgram ................ | G03B 35/08 348/47 |

(Continued)

FOREIGN PATENT DOCUMENTS

| | | |
|---|---|---|
| JP | 09-274669 | 10/1997 |
| JP | 2000-270211 | 9/2000 |
| JP | 2009-049547 | 3/2009 |

*Primary Examiner* — Bhavesh M Mehta
*Assistant Examiner* — Mai H Tran
(74) *Attorney, Agent, or Firm* — Rankin, Hill & Clark LLP

(57) ABSTRACT

A non-contact 3D measuring system is configured to provide a combined three-dimensional shape of an object to be imaged based on a frame image, which has been captured by a camera while a measuring head is being scanned in an optical axis (Z-axis) direction, and the information on the position at which the image has been acquired. The system includes: a position detector for detecting a scanning position of the measuring head while a plurality of raw images are captured; and a computer for generating an interpolation image by linear interpolation for the captured raw image using the information of the scanning position as well as generating a combined frame image using the interpolation image.

13 Claims, 12 Drawing Sheets

(56) References Cited

U.S. PATENT DOCUMENTS

| | | | | |
|---|---|---|---|---|
| 5,615,003 A * | 3/1997 | Hermary | G01B 11/245 | 250/559.23 |
| 5,995,650 A * | 11/1999 | Migdal | G01B 11/2518 | 382/154 |
| 6,205,243 B1 * | 3/2001 | Migdal | G01B 11/2518 | 382/154 |
| 6,441,888 B1 * | 8/2002 | Azuma | G01S 7/481 | 356/4.01 |
| 6,522,712 B1 * | 2/2003 | Yavuz | G06T 11/005 | 378/4 |
| 6,542,249 B1 * | 4/2003 | Kofman | G01B 11/2513 | 356/601 |
| 6,600,168 B1 * | 7/2003 | Geng | G06K 9/2036 | 250/559.19 |
| 7,310,154 B2 * | 12/2007 | Kitaguchi | G01B 11/2545 | 250/559.22 |
| 7,493,470 B1 * | 2/2009 | Cumplido | G06F 7/5443 | 712/210 |
| 7,538,764 B2 * | 5/2009 | Salomie | G06T 17/20 | 345/418 |
| 7,751,066 B2 * | 7/2010 | Iwasaki | G06T 7/521 | 250/550 |
| 7,804,585 B2 * | 9/2010 | Tropf | G01B 11/2513 | 356/3.1 |
| 7,978,346 B1 * | 7/2011 | Riza | G01B 11/24 | 356/368 |
| 9,007,532 B2 * | 4/2015 | Rumreich | G02B 26/101 | 348/744 |
| 9,568,304 B2 * | 2/2017 | Haitjema | G01B 11/0608 | |
| 9,605,950 B2 * | 3/2017 | Wolff | G01B 11/026 | |
| 9,958,267 B2 * | 5/2018 | Angot | H04N 5/23245 | |
| 9,962,244 B2 * | 5/2018 | Esbech | G01J 3/513 | |
| 2002/0041282 A1 * | 4/2002 | Kitaguchi | G01B 11/2545 | 345/418 |
| 2002/0126917 A1 * | 9/2002 | Akiyoshi | G06T 3/4007 | 382/300 |
| 2003/0071194 A1 * | 4/2003 | Mueller | G01B 11/00 | 250/208.1 |
| 2003/0112507 A1 * | 6/2003 | Divelbiss | G02B 26/008 | 359/464 |
| 2003/0228053 A1 * | 12/2003 | Li | G06T 7/55 | 382/154 |
| 2004/0091174 A1 * | 5/2004 | Wang | G06T 3/4007 | 382/300 |
| 2004/0208277 A1 * | 10/2004 | Morikawa | A61B 6/032 | 378/4 |
| 2004/0257360 A1 * | 12/2004 | Sieckmann | G06T 17/05 | 345/419 |
| 2005/0238135 A1 * | 10/2005 | Younis | G06T 11/005 | 378/8 |
| 2005/0257748 A1 * | 11/2005 | Kriesel | A01K 11/008 | 119/51.02 |
| 2007/0195408 A1 * | 8/2007 | Divelbiss | G02B 26/008 | 359/462 |
| 2008/0208499 A1 * | 8/2008 | Miyashita | G01M 11/0264 | 702/82 |
| 2008/0317334 A1 * | 12/2008 | Hausler | G01B 11/25 | 382/154 |
| 2009/0046947 A1 | 2/2009 | Kobayashi | | |
| 2010/0002950 A1 * | 1/2010 | Arieli | G01J 9/02 | 382/255 |
| 2011/0007136 A1 * | 1/2011 | Miura | G06T 3/4007 | 348/46 |
| 2012/0140243 A1 * | 6/2012 | Colonna de Lega | A61F 9/00836 | 356/609 |
| 2012/0176475 A1 * | 7/2012 | Xu | G02B 21/0092 | 348/46 |
| 2012/0203108 A1 * | 8/2012 | Tsujita | A61B 8/08 | 600/445 |
| 2012/0238878 A1 * | 9/2012 | Tanabe | A61B 8/4461 | 600/447 |
| 2013/0064344 A1 * | 3/2013 | Carol | A61B 6/032 | 378/10 |
| 2013/0155203 A1 * | 6/2013 | Watanabe | H04N 13/207 | 348/49 |
| 2013/0243352 A1 * | 9/2013 | Khurd | G06T 3/0068 | 382/284 |
| 2013/0303913 A1 * | 11/2013 | Tian | A61B 8/483 | 600/447 |
| 2014/0115022 A1 * | 4/2014 | Yasuno | G01B 9/02044 | 708/204 |
| 2014/0120493 A1 * | 5/2014 | Levin | A61C 9/0066 | 433/29 |
| 2014/0340426 A1 * | 11/2014 | Furuhata | G06T 11/60 | 345/635 |
| 2015/0145964 A1 * | 5/2015 | Kazakevich | H04N 13/139 | 348/47 |
| 2016/0035076 A1 * | 2/2016 | Schwarzband | G06T 7/001 | 382/149 |
| 2016/0151024 A1 * | 6/2016 | Goto | A61B 6/027 | 378/8 |
| 2017/0330340 A1 * | 11/2017 | Watanabe | G06T 7/536 | |
| 2018/0252517 A1 * | 9/2018 | Le Neel | G01B 11/024 | |
| 2018/0307950 A1 * | 10/2018 | Nealis | G06K 9/66 | |

* cited by examiner

NON-CONTACT 3D MEASURING SYSTEM

CROSS-REFERENCE TO RELATED APPLICATION

The disclosure of Japanese Patent Application No. 2016-095682 filed on May 11, 2016 including specifications, drawings and claims are incorporated herein by reference in its entirety.

TECHNICAL FIELD

The present invention relates to a non-contact 3D measuring system, and particularly, to a non-contact 3D measuring system which is suitable for use in a vision measuring system or a measuring microscope that includes an interlace camera, and which enables a combined frame image to be provided with high accuracy and thus highly accurate shape measurement.

BACKGROUND ART

A non-contact 3D combining method employed for a conventional vision measuring system may be classified into the provision of a combined three-dimensional shape by focal position detection (Point From Focus; hereinafter referred to as PFF) and the provision of a combined three-dimensional shape by white light interference (hereafter referred to as WLI). Both the methods provides a combined three-dimensional shape on the basis of successive images, captured while the measuring head is being scanned in the direction of an optical axis (images referred to here are frame images), and the information on the position at which the images are acquired.

Here, when an interlace camera is used to capture successive images, as illustrated by way of example in FIG. 1 STEP (1), since an image within the range of one field of view is separately captured in two fields, i.e., odd and even fields, the interlace camera mounted on a measuring head 10 to be scanned in the Z axis direction needs to combine the Odd and Even field images into an image of one field of view (frame image) in order to acquire a combined three-dimensional shape.

As shown in FIG. 1 STEP (1), for example, for Odd and Even field images (raw images) captured at positions $Z_2$ and $Z_3$, the frame image combining process produces interpolation images of the Even and Odd fields at the same respective positions $Z_2$ and $Z_3$ (interpolation field images) as shown in FIG. 1 STEP (2), and then combines the raw images at the positions $Z_2$ and $Z_3$ (Odd at $Z_2$ and Even at $Z_3$) with the respective interpolation field images (Even at $Z_2$ and Odd at $Z_3$), thereby generating the frame images at the respective positions $Z_2$ and $Z_3$ as shown in FIG. 1 STEP (3).

SUMMARY OF INVENTION

Technical Problem

However, as illustrated by way of example in FIG. 2, the conventional frame image combining process is performed assuming that images are captured at constant distance intervals in the scanning direction of the measuring head by capturing the images at constant time intervals and moving the measuring head 10 at constant speeds. That is, as a technique for generating an Even interpolation field image for an Odd field image at a certain position, Even field images before and after the Odd field image (Even raw images 1 and 2 in FIG. 2) are used to employ, as an Even interpolation field image, an image having a brightness value acquired by a simple average of brightness values $I1_{ij}$ and $I2_{ij}$ of the respective pixels as below:

$$I_{ij}=(I1_{ij}+I2_{ij})/2.$$

However, in practice, since the measuring head is not moved at constant speeds due to variations in speed during the acceleration/deceleration of the measuring head or due to speed ripples at the time of a low-speed movement thereof, images are not captured at constant distance intervals. In particular, using a servo motor to move the measuring head may cause the acceleration and deceleration thereof to be gradually performed at the start and end of a movement, thereby making it difficult to acquire images at accurate constant space pitches by the image acquirement at constant time pitches. As a result, properly combined frame images cannot be acquired, with the result of reduced measurement accuracy.

Note that disclosed in Japanese Patent Application Laid-Open No. 2000-270211 is to combine together images of Odd data and Even data; disclosed in Japanese Patent Application Laid-Open No. 2009-49547 is to weight each of pieces of image data of a plurality of images, followed by combining them; and disclosed in Japanese Patent Application Laid-Open No. Hei. 9-274669 is to produce a combined image without determining in advance the distance to an object of interest. However, any of them did not successfully address the aforementioned problem.

The present invention has been developed to address the aforementioned conventional problems. An object of the present invention is to provide an improved method for acquiring a combined frame image, thereby improving measurement accuracy.

Solution to Problem

The present invention has solved the aforementioned problems by providing a non-contact 3D measuring system configured to provide a combined three-dimensional shape of an object to be imaged based on a frame image captured by a camera while scanning a measuring head thereof in an optical axis direction and information of a position at which the image is acquired, the non-contact 3D measuring system including: a position detector for detecting scanning positions of the measuring head while a plurality of raw images are captured; and a computer for generating interpolation images by linear interpolation using information of the scanning positions for the captured raw images and for generating a combined frame image using the interpolation images.

Here, when the camera is an interlace camera, the plurality of raw images are employed as raw images of respective odd and even fields, and interpolation images of even and odd fields at the same respective positions are generated by linear interpolation of the captured raw images using the information of the scanning positions, so that the raw image of the even field and the interpolation image of the odd field at each position, and the raw image of the odd field and the interpolation image of the even field are combined to produce the combined frame image.

Alternatively, when the camera is a noninterlace camera, it is possible to produce interpolation images between the plurality of raw images.

Furthermore, the non-contact 3D measuring system can include at least any one of an image optical measuring head that includes an objective lens, a camera, and an illumination unit and is capable of performing the Point From Focus (PFF) measurement, and a White Light Interference (WLI) optical measuring head that includes an interference objective lens, a camera, and an illumination unit.

Furthermore, the position detector can be a Z-axis scale.

Furthermore, in performing the Point From Focus (PFF) measurement with a non-contact 3D measuring system using an image optical measuring head that includes an objective lens, a camera, and an illumination unit, it is possible to include the following steps of:

scanning the objective lens along a Z-axis column in a Z-axis direction over a work;

acquiring a raw image from the camera mounted on the image optical measuring head and also acquiring a Z coordinate value from a Z-axis scale mounted on the Z-axis column, thereby stacking images and Z coordinate values at a constant pitch;

generating an interpolation image by linear interpolation using information of the scanning positions for the captured raw images and generating a combined frame image using the interpolation image;

generating a contrast curve at each pixel position from the stacked images; and combining a 3D shape with a contrast peak position of each pixel being employed as a Z position.

Or alternatively, in performing the WLI measurement with a non-contact 3D measuring system using a White Light Interference (WLI) optical measuring head that includes an interference objective lens, a camera, and an illumination unit, it is possible to include the following steps of:

scanning the interference objective lens in a Z-axis direction;

acquiring a raw image from the camera mounted on the WLI optical measuring head and also acquiring a Z coordinate value from a Z-axis scale mounted on a Z-axis column, thereby stacking images and Z coordinate values at a constant pitch;

generating an interpolation image by linear interpolation using information of the scanning positions for the captured raw images and generating a combined frame image using the interpolation image;

generating an interference signal of each pixel from interference fringes of the stacked images; and combining a 3D shape with the peak position of the interference fringes of each pixel employed as a Z position.

Advantageous Effects of Invention

In the present invention, for example, when the interlace camera is used, as schematically illustrated in FIG. 3, for example, in generating an Even interpolation field image, the image is to be generated by the brightness value below:

$$I_{ij}=\{(dZ_2-dZ_1)*I1_{ij}+dZ_1*I2_{ij}\}/dZ_2,$$

where the brightness value $I_{ij}$ is acquired by linear interpolation using the position information (Z coordinate values, $dZ_1$ and $dZ_2$) of the field image captured by the measuring head 10, the position information being acquired, for example, by the Z-axis scale 12.

Thus, greater promise for high precision can be expected as compared with the combined frame image by the conventional simple average. Furthermore, even when there occurs a lack in the field image acquired by the interlace camera, the present invention can be employed so as to produce an interpolation field image accurately from adjacent field images that have no lack. It is thus possible to prevent degradation of precision.

Note that the applications of the present invention are not limited to those using an interlace camera, but may also be applicable even to the case where interpolation images are generated between a plurality of raw images when a non-interlace progressive camera is used.

These and other novel features and advantages of the present invention will become apparent from the following detailed description of preferred embodiments.

BRIEF DESCRIPTION OF DRAWINGS

The preferred embodiments will be described with reference to the drawings, wherein like elements have been denoted throughout the figures with like reference numerals, and wherein.

DESCRIPTION OF EMBODIMENTS

Embodiments of the present invention will be described below in detail with reference to the drawings. It should be noted that the present invention is not limited to the contents described in the following embodiments and practical examples. The components of the embodiments and practical examples described below may include ones easily conceivable by those skilled in the art, substantially identical ones, and ones within the range of equivalency. The components disclosed in the embodiments and practical examples described below may be combined as appropriate, and may be selected and used as appropriate.

Figure 4:
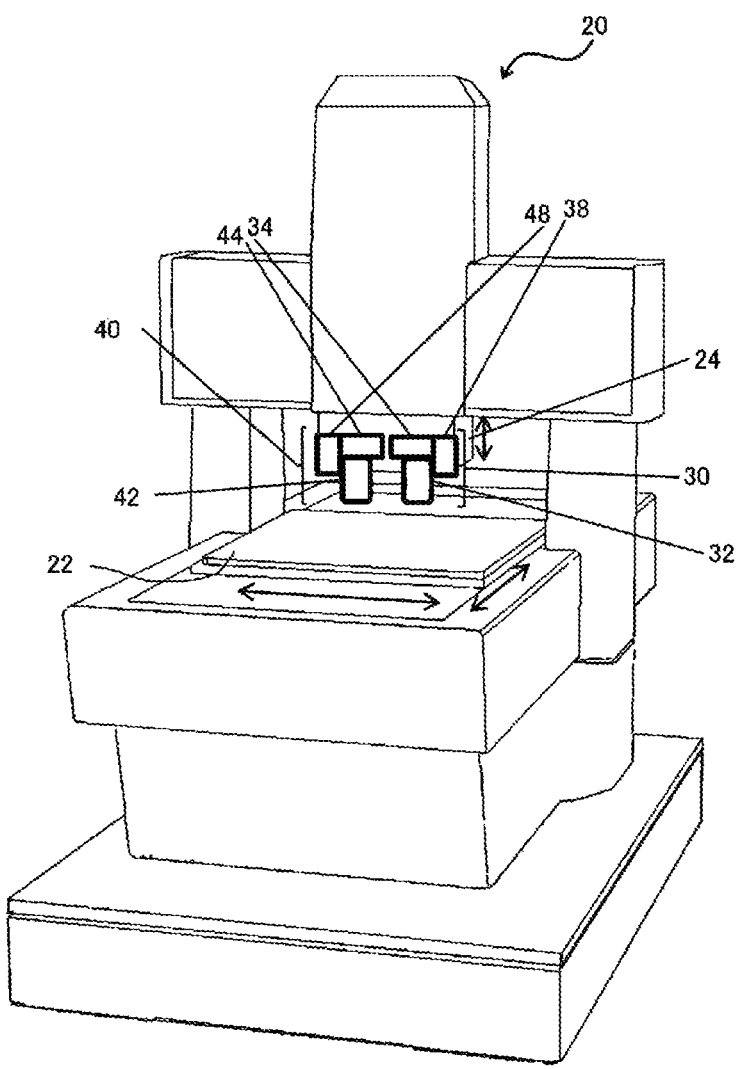
FIG. 4 is a perspective view illustrating an entire configuration of an example of a non-contact 3D measuring system to which the present invention is applied.
Figure 5:
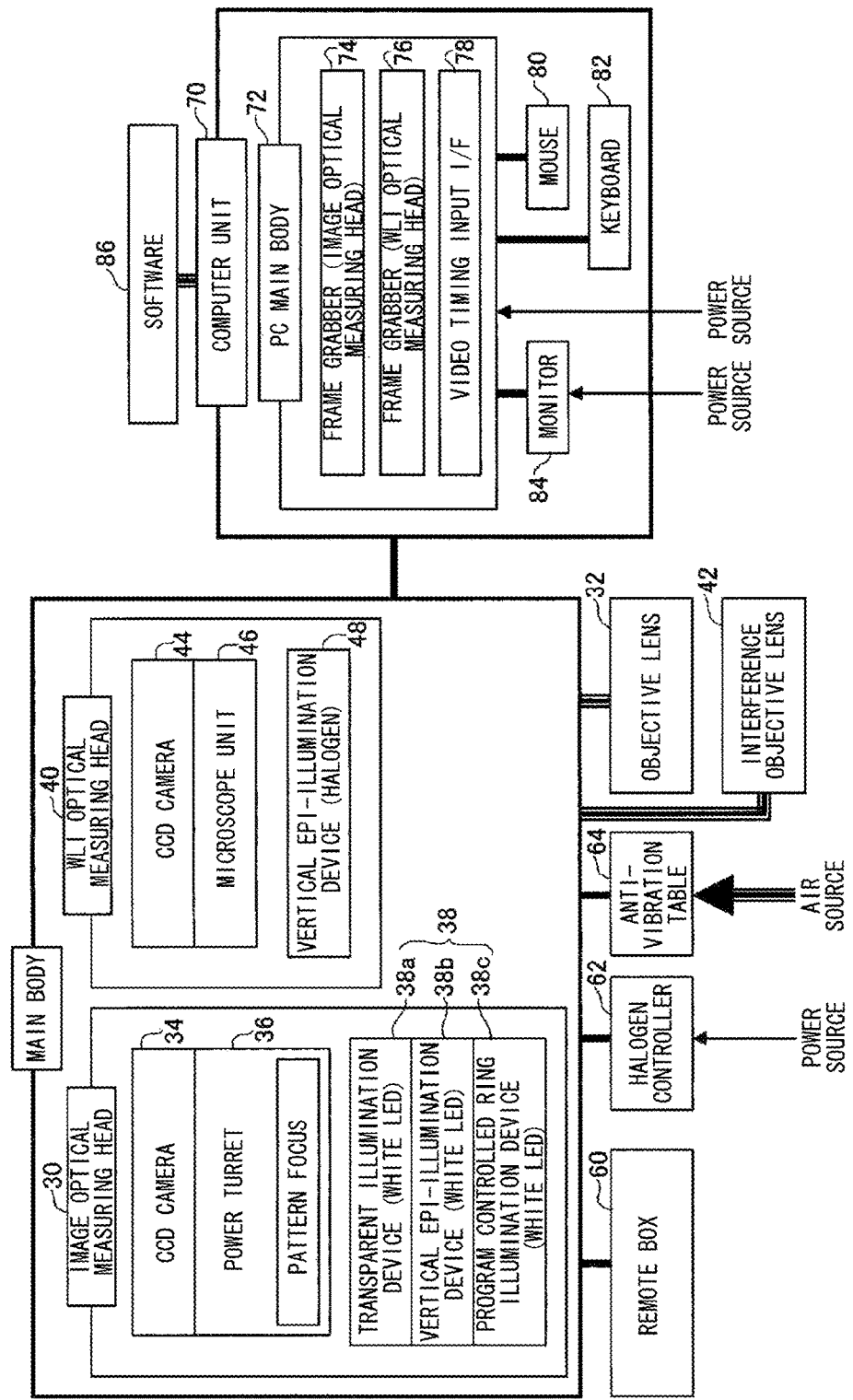
FIG. 5 is a block diagram illustrating the system configuration of the same system.

As illustrated in the entire configuration of FIG. 4 and in the system configuration of FIG. 5, the embodiment of the present invention is a non-contact 3D measuring system 20 with an XY stage 22 and a Z-axis column 24. The system 20 is provided with both or one of two measuring heads: an image optical measuring head 30 capable of performing the PFF measurement and including an objective lens 32, a CCD camera 34, and a illumination unit 38; and a WLI optical measuring head 40 including an interference objective lens 42, a CCD camera 44, and a illumination unit 48.

The Z-axis column 24 is provided with a Z-axis scale (not shown) (symbol 12 in FIG. 3) and capable of measuring fine positions in the Z-axis direction of the measuring heads 30 and 40.

As shown in detail in FIG. 5, the image optical measuring head 30 includes the CCD camera 34 and a power turret 36 for replacing the objective lens 32. The illumination unit 38 includes, for example, a white LED transparent illumination device 38a, a white LED vertical epi-illumination device 38b, and a white LED program controlled ring illumination device 38c.

As also shown in detail in FIG. 5, the WLI optical measuring head 40 includes the CCD camera 44 and a microscope unit 46, and the illumination unit 48 includes, for example, a halogen bulb vertical epi-illumination device.

FIG. 5 shows a remote box 60 for remote control of the main body; a halogen controller 62; an anti-vibration table 64; a computer unit 70 including a computer (PC) main body 72, a mouse 80, a keyboard 82, and a monitor 84. The computer main body 72 includes a frame grabber 74 for an image optical measuring head, a frame grabber 76 for a WLI optical measuring head and a video timing input interface (I/F) 78. 86 denotes a software 86

Note that in the case of the 3D measuring system for the PFF measurement, the WLI optical measuring head 40, the interference objective lens 42, and the frame grabber 76 for the WLI optical measuring head are eliminated. On the other hand, in the case of the WLI measurement 3D measuring system, the PFF measurement is not performed.

Figure 6:
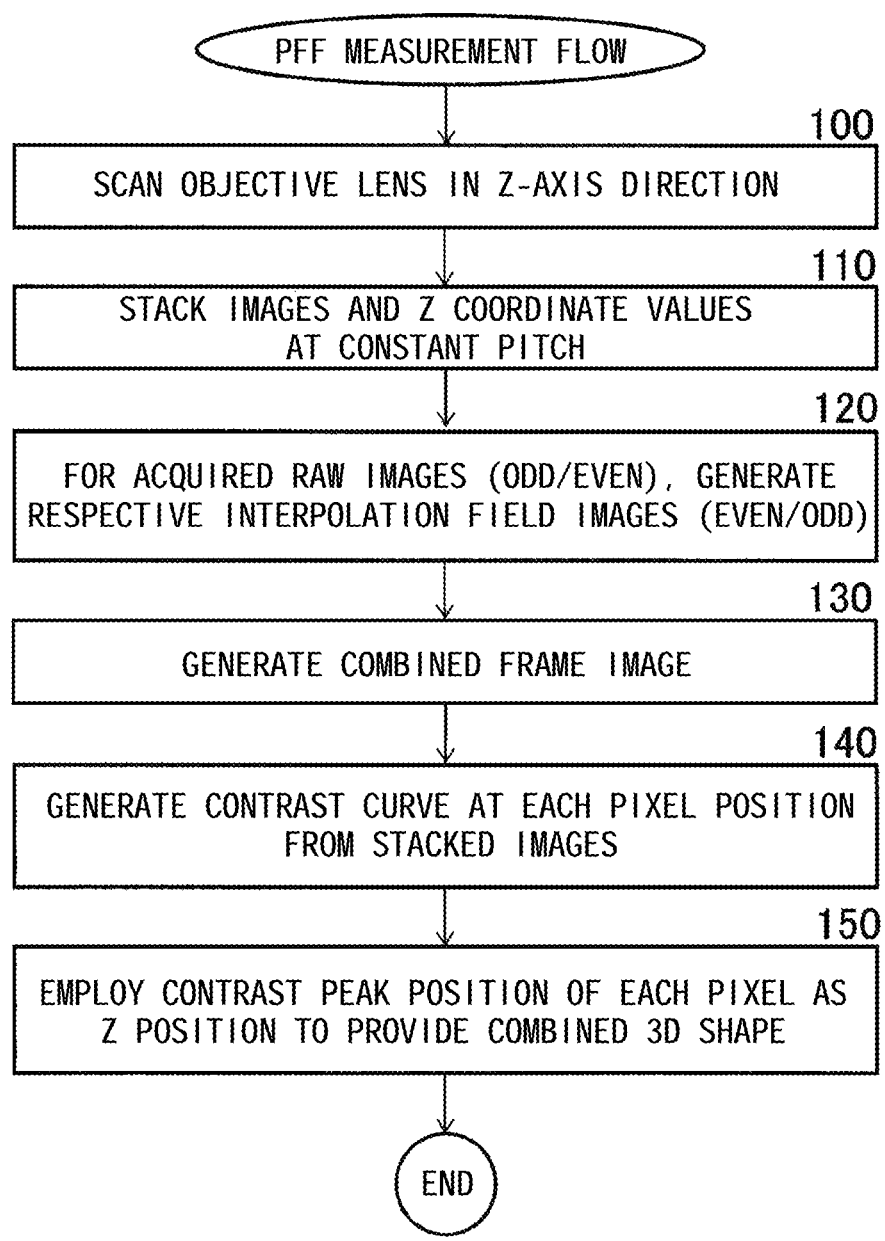
FIG. 6 is a flowchart indicative of the procedure of the PFF measurement.

Now, with reference to FIGS. 6 and 7A, 7B, the procedure for the PFF measurement will be described.

Figure 7A:
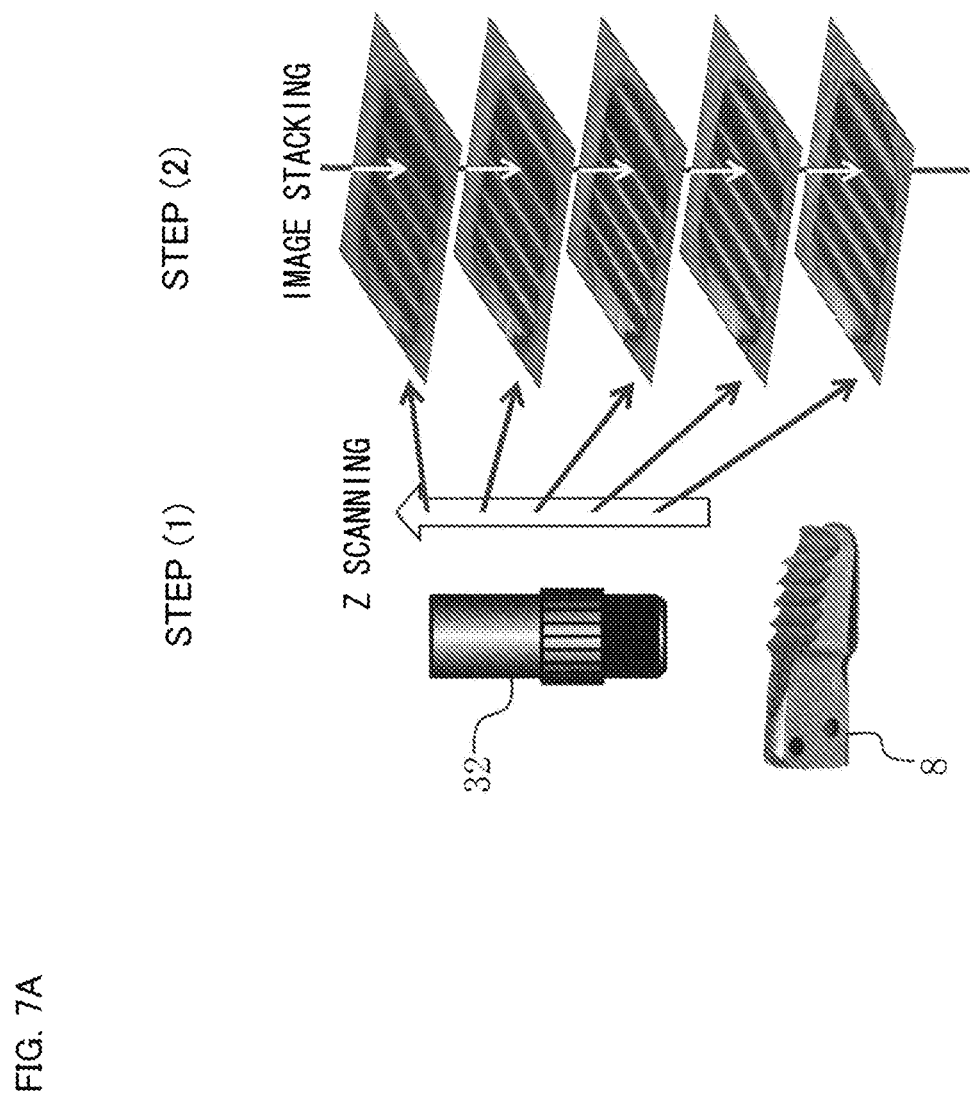
FIGS. 7A and 7B are explanatory views illustrating the principle of the PFF measurement.

First, in step 100, as shown in FIG. 7A STEP (1), the objective lens 32 is scanned in the Z-axis direction along the Z-axis column 24 across a work 8.

Next, in step 110, as shown in FIG. 7A STEP (2), images and Z coordinate values are stacked at a constant pitch. More specifically, a raw image is acquired from the CCD camera 34 mounted on the image optical measuring head 30 and the Z coordinate value is acquired from the Z-axis scale (not illustrated) mounted on the Z-axis column 24.

Figure 1:
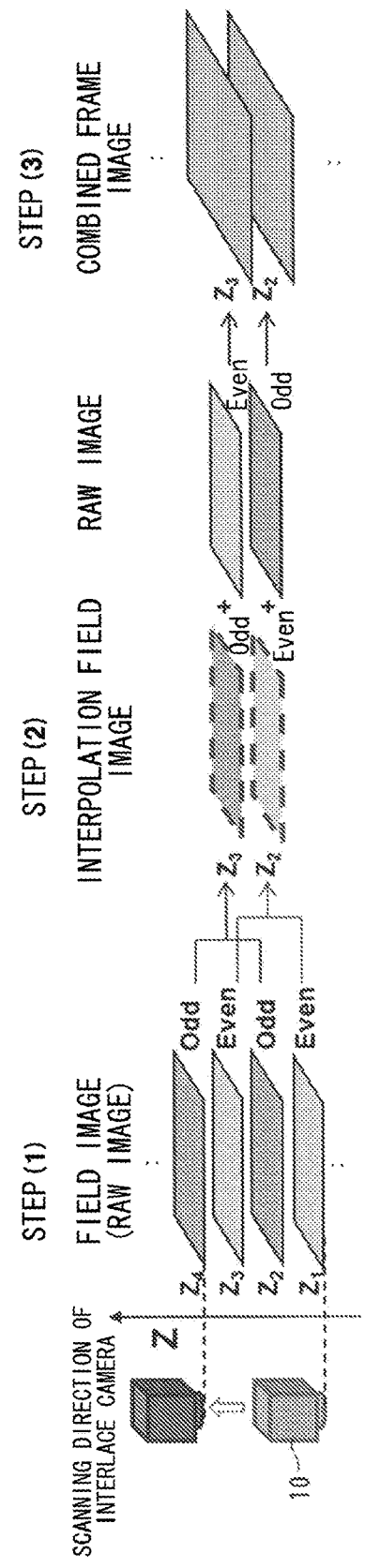
FIG. 1 is an explanatory view illustrating a method for providing a combined frame image by an interlace camera.
Figure 2:
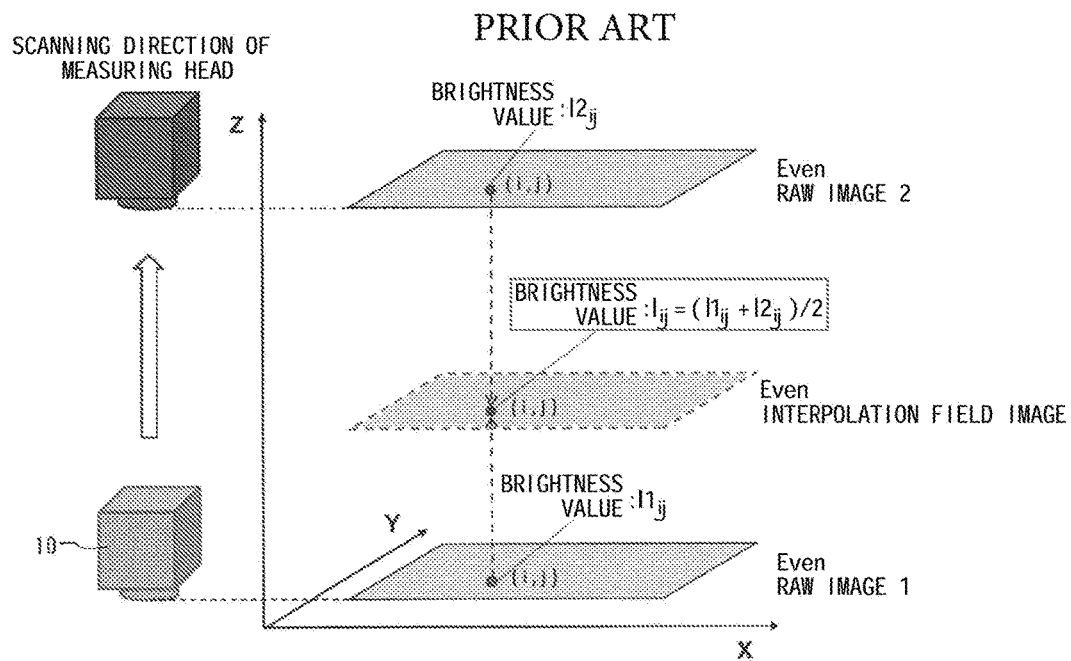
FIG. 2 is an explanatory view illustrating an interpolation process of a conventional field image.
Figure 3:
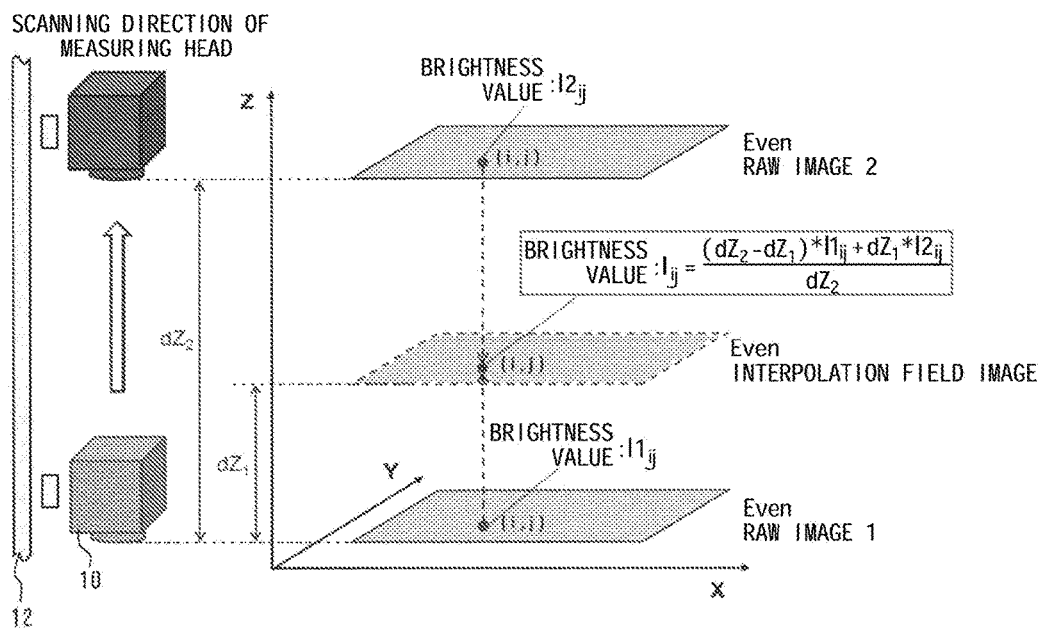
FIG. 3 is an explanatory view illustrating the principle of an interpolation process of a field image by linear interpolation according to the present invention when an interlace camera is used.

Next, in step 120, according to the present invention, by the method as shown in FIG. 3, interpolation field images (Even/Odd) are generated for the acquired respective raw images (Odd/Even), and then in step 130, a combined frame image is generated.

Figure 7B:
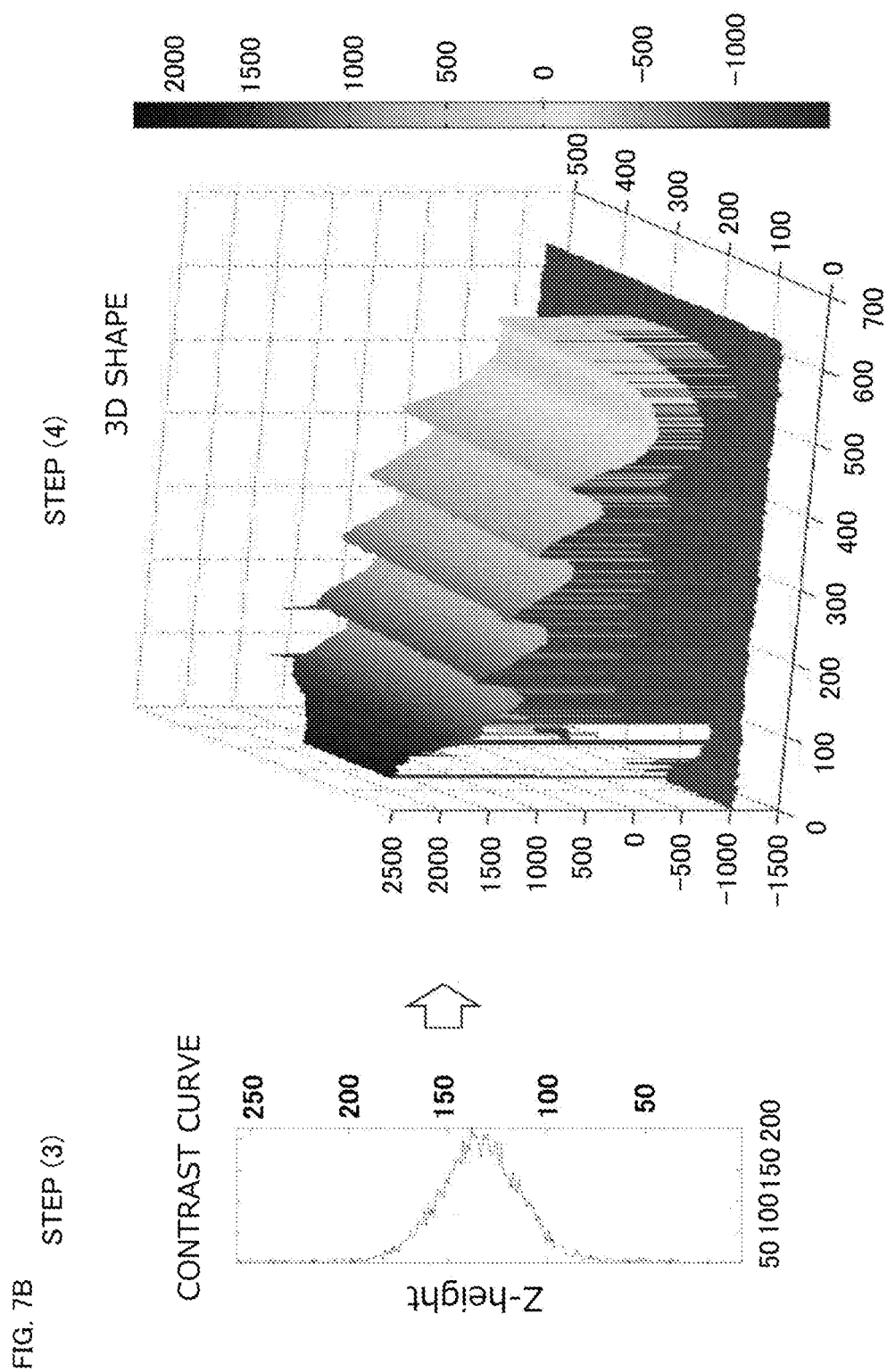

Next, in step 140, as shown in FIG. 7B STEP (3), a contrast curve is generated at each pixel position from the stacked images.

Next, in step 150, as shown in FIG. 7B STEP (4), the contrast peak position of each pixel is employed as a Z position to provide a combined 3D shape.

In this manner, it is possible to increase the shape measurement accuracy for the PFF image measurement using an interlace camera.

Now, the WLI measurement also using an interlace camera will be described.

Figure 8:
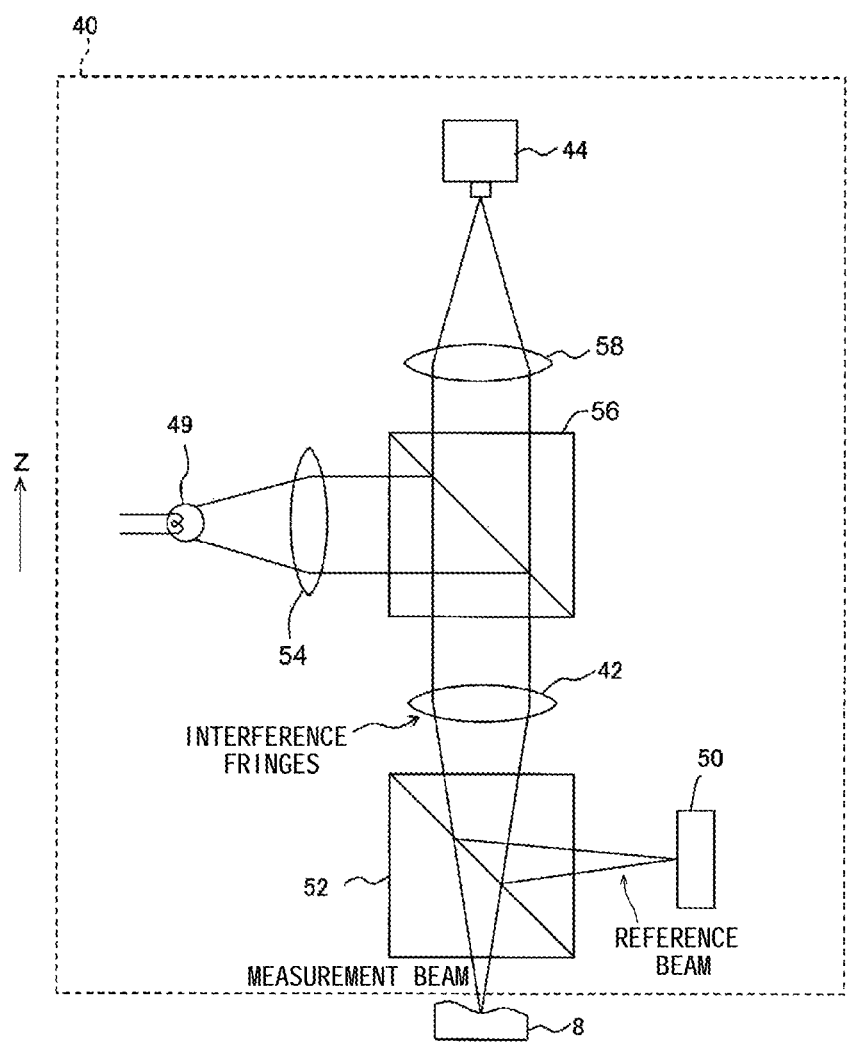
FIG. 8 is a view illustrating the configuration of a Mirau type optical system for WLI measurement.
Figure 9:
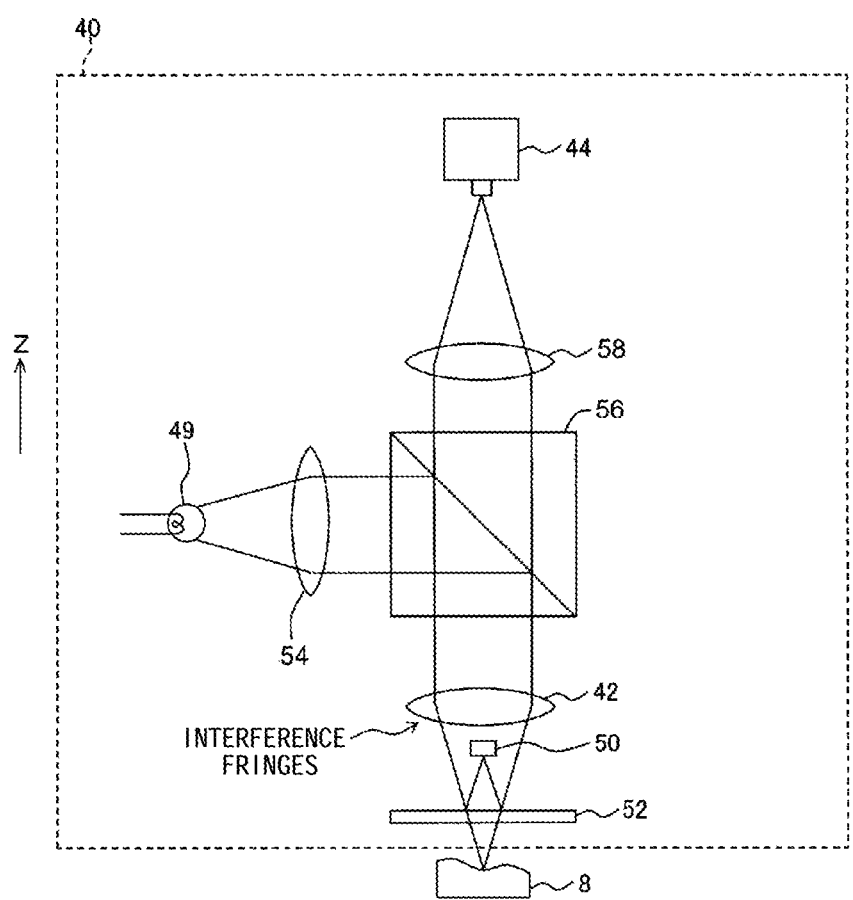
FIG. 9 is also a cross-sectional view illustrating the configuration of a Michelson type optical system.

In this case, the Mirau type optical system is configured as shown in FIG. 8, and the Michelson type optical system is configured as shown in FIG. 9.

In any of the configurations, the illumination beam emitted from a white light source 49 of the illumination unit is split into two beams of light, i.e., one to a reference mirror 50 and the other to the work 8, by a beam splitter 52 for the interference objective lens 42. Here, scanning the interference objective lens 42 in the Z-axis direction causes interference fringes to occur about the position at which the optical-path difference between the beam of light reflected on the reference mirror 50 and the beam of light reflected on the surface of the work 8 is zero. In this context, the position of the peak strength of the interference fringes is detected at each pixel position of the CCD camera 44, thereby making it possible to acquire a three-dimensional shape of the surface of the work 8. The figure shows a collimator lens 54, a beam splitter 56, and a tube lens 58.

Figure 10:
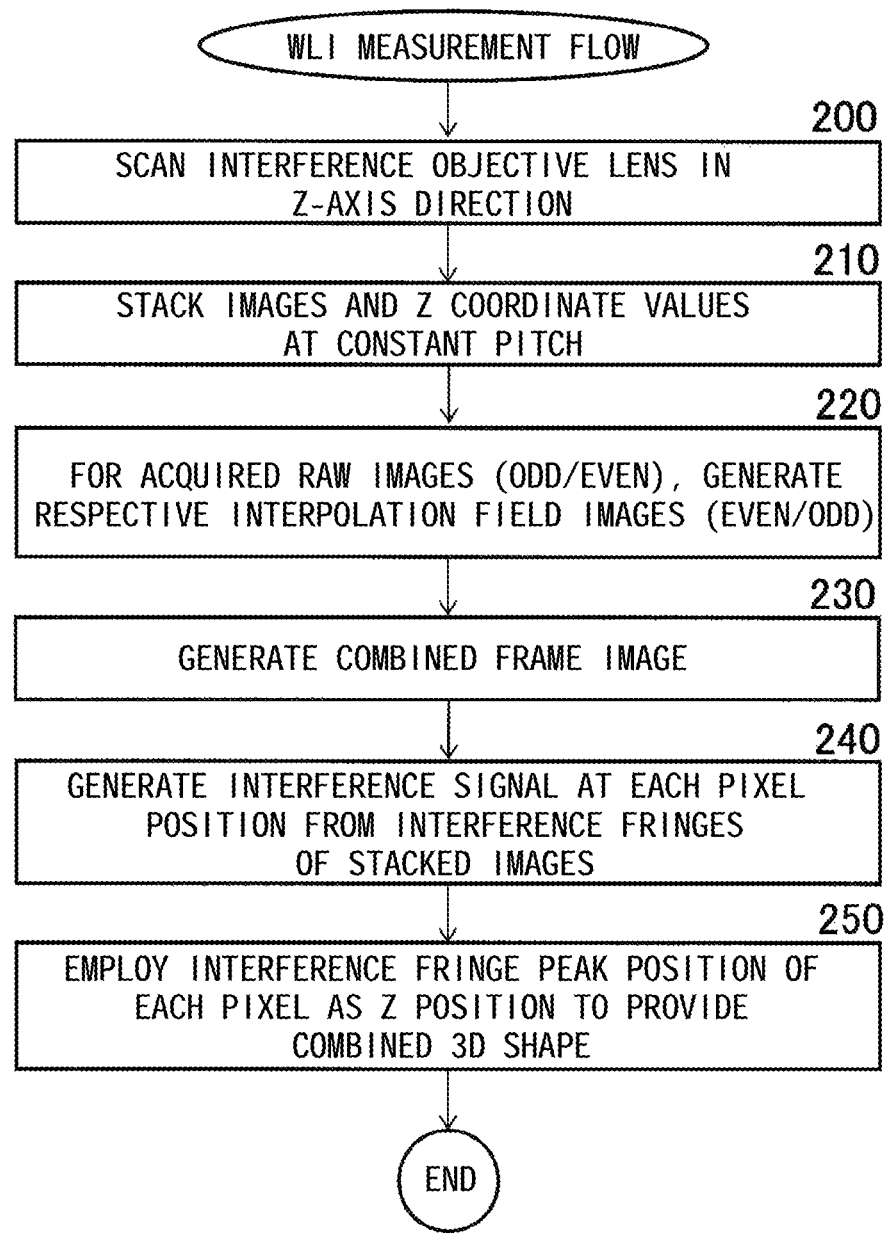
FIG. 10 is a flowchart indicative of the procedure of the WLI measurement.

Now, with reference to FIG. 10, the procedure of the WLI measurement will be described.

First, in step 200, the interference objective lens 42 is scanned in the Z-axis direction.

Next, in step 210, images and Z coordinate values are stacked at a constant pitch. Here, a raw image is acquired from the CCD camera 44 mounted on the WLI optical measuring head 40, and a Z coordinate value is acquired from the Z-axis scale (not illustrated) mounted on the Z-axis column 24.

Next, in step 220, according to the present invention, by the method as shown in FIG. 3, for the acquired raw images (Odd/Even), the respective interpolation field images (Even/Odd) are generated, and then in step 230, a combined frame image is generated.

Figure 11:
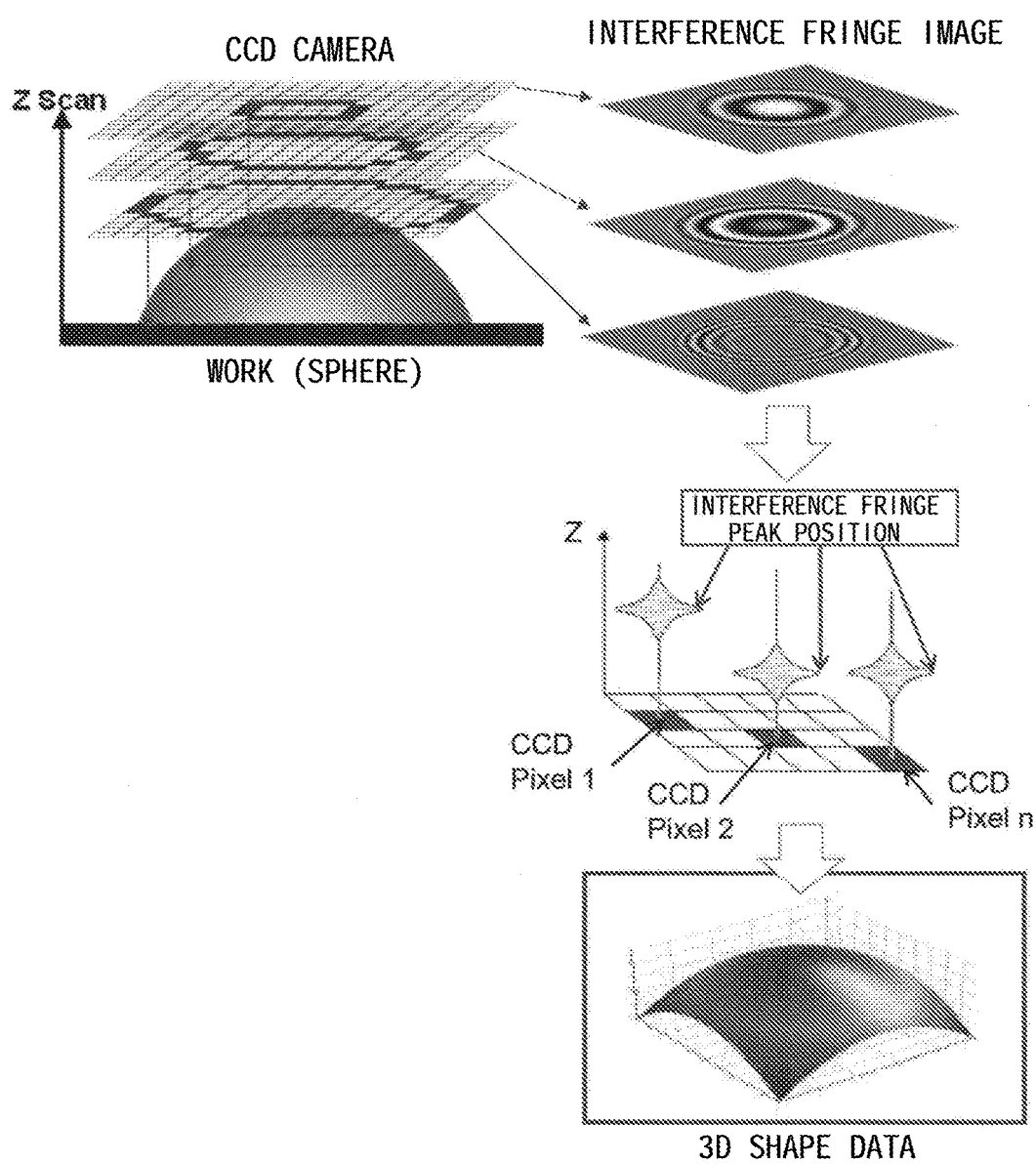
FIG. 11 is an explanatory view illustrating the principle of the WLI measurement.

Next, in step 240, as shown in FIG. 11, the interference signal of each pixel is generated from the interference fringes of the stacked images.

Next, in step 250, the peak position of the interference fringes of each pixel is employed as a Z position to provide a combined 3D shape.

It is thus possible to improve the shape measurement accuracy of the WLI image measurement using an interlace camera.

Figure 12:
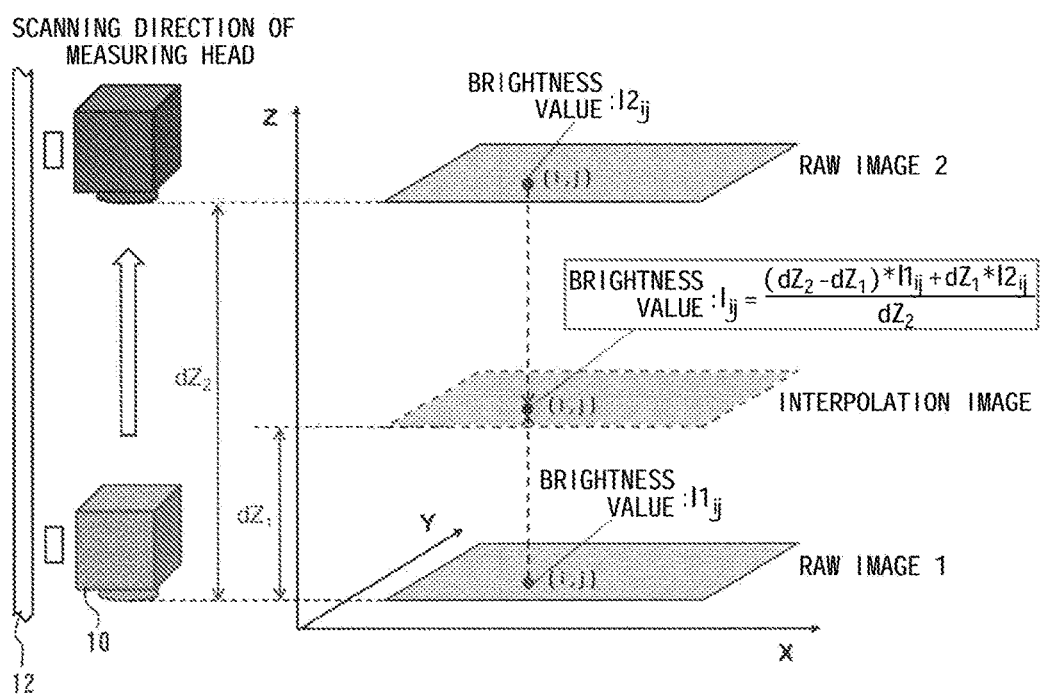
FIG. 12 is an explanatory view illustrating the principle of an interpolation process for a field image by linear interpolation according to the present invention when a noninterlace camera is used.

Note that in any of the embodiments, the present invention is applied to a 3D measuring system using an interlace camera. However, the invention is not limited thereto. As the principle is shown in FIG. 12, the invention is also applicable to a 3D measuring system or a measuring microscope using a noninterlace camera. Furthermore, the camera is not limited to a CCD camera. Furthermore, the measurement principle is limited to neither the PFF measurement nor the WLI measurement.

It should be apparent to those skilled in the art that the above-described embodiments are merely illustrative which represent the application of the principles of the present invention. Numerous and varied other arrangements can be readily devised by those skilled in the art without departing from the spirit and the scope of the present invention.

The invention claimed is:

1. A non-contact 3D measuring system configured to provide a combined three-dimensional shape of an object to be imaged based on a frame image captured by a camera while scanning a measuring head thereof in an optical axis direction and information of a position at which the image is acquired, the non-contact 3D measuring system comprising:

a position detector for detecting scanning positions of the measuring head while a plurality of raw images are captured; and a computer for generating interpolation images by linear interpolation using information of the scanning positions for the captured raw images and for generating a combined frame image using the interpolation images, wherein the position detector is configured to detect a first scanning position of the measuring head, at which a first raw image is captured, and detect a second scanning position of the measuring head, at which a second raw image is captured, the second scanning position being different from the first scanning position in the optical axis direction, and wherein the computer is configured to generate at least one of the interpolation images by linear interpolation between the first raw image captured at the first scanning position and the second raw image captured at the second scanning position using information of the first scanning position and the second scanning position.

2. The non-contact 3D measuring system according to claim 1, wherein:
the camera is an interlace camera;
the plurality of raw images are raw images of respective odd and even fields; and
interpolation images of even and odd fields at the same respective positions are generated by linear interpolation of the captured raw images using the information of the scanning positions, so that the raw image of the even field and the interpolation image of the odd field at each position, and the raw image of the odd field and the interpolation image of the even field are combined to generate the combined frame image.

3. The non-contact 3D measuring system according to claim 1, wherein:
the camera is a noninterlace camera; and
interpolation images between the plurality of raw images are generated.

4. The non-contact 3D measuring system according to claim 1, comprising at least any one of an image optical measuring head that includes an objective lens, a camera, and an illumination unit and is capable of performing the Point From Focus (PFF) measurement, and a White Light Interference (WLI) optical measuring head that includes an interference objective lens, a camera, and an illumination unit.

5. The non-contact 3D measuring system according to claim 1, wherein the position detector is a Z-axis scale.

6. A method of performing the Point From Focus (PFF) measurement with a non-contact 3D measuring system using an image optical measuring head that includes an objective lens, a camera, and an illumination unit, the method comprising the steps of:
scanning the objective lens along a Z-axis column in a Z-axis direction over a work;
acquiring a raw image from the camera mounted on the image optical measuring head and also acquiring a Z coordinate value from a Z-axis scale mounted on the Z-axis column, thereby stacking images and Z coordinate values at a constant pitch;
generating an interpolation image by linear interpolation using information of the scanning positions for the captured raw images and generating a combined frame image using the interpolation image;
generating a contrast curve at each pixel position from the stacked images; and
combining a 3D shape with a contrast peak position of each pixel being employed as a Z position,
wherein the step of acquiring the Z coordinate value comprises detecting a first scanning position of the image optical measuring head, at which a first raw image is captured, and detecting a second scanning position of the image optical measuring head, at which a second raw image is captured, the second scanning position being different from the first scanning position in the Z-axis direction, and wherein the step of generating the interpolation image comprises generating the interpolation image by linear interpolation between the first raw image captured at the first scanning position and the second raw image captured at the second scanning position using information of the first scanning position and the second scanning position.

7. A method of performing the WLI measurement with a non-contact 3D measuring system using a White Light Interference (WLI) optical measuring head that includes an interference objective lens, a camera, and an illumination unit, the method comprising the steps of:
scanning the interference objective lens in a Z-axis direction;
acquiring a raw image from the camera mounted on the WLI optical measuring head and also acquiring a Z coordinate value from a Z-axis scale mounted on a Z-axis column, thereby stacking images and Z coordinate values at a constant pitch;
generating an interpolation image by linear interpolation using information of the scanning positions for the captured raw images and generating a combined frame image using the interpolation image;
generating an interference signal of each pixel from interference fringes of the stacked images; and
combining a 3D shape with the peak position of the interference fringes of each pixel employed as a Z position,
wherein the step of acquiring the Z coordinate value comprises detecting a first scanning position of the WLI optical measuring head, at which a first raw image is captured, and detecting a second scanning position of the WLI optical measuring head, at which a second raw image is captured, the second scanning position being different from the first scanning position in the Z-axis direction, and wherein the step of generating the interpolation image comprises generating the interpolation image by linear interpolation between the first raw image captured at the first scanning position and the second raw image captured at the second scanning position using information of the first scanning position and the second scanning position.

8. The non-contact 3D measuring system according to claim 1,
wherein the at least one of the interpolation images is generated by linear interpolation between the first raw image captured at the first scanning position and the second raw image captured at the second scanning position using the first scanning position, the second scanning position, a first brightness value at the first scanning position and a second brightness value at the second scanning position.

9. The non-contact 3D measuring system according to claim 1,
wherein the at least one of the interpolation images is generated by a brightness value below:

$$I_{ij} = \{(dZ_2 - dZ_1) * I1_{ij} + dZ_1 * I2_{ij}\}/dZ_2,$$

where $I_{ij}$ represents the brightness value of the at least one of the interpolation images, $dZ_1$ represents the first scanning position, $dZ_2$ represents the second scanning position, $I1_{ij}$ represents a first brightness value at the first scanning position and $I2_{ij}$ represents a second brightness value at the second scanning position.

10. The method of performing the Point From Focus (PFF) measurement according to claim 6, wherein the interpolation image is generated by linear interpolation between the first raw image captured at the first scanning position and the second raw image captured at the second scanning position using a first Z coordinate value of the first scanning position, a second Z coordinate value of the second scanning position, a first brightness value at the first scanning position and a second brightness value at the second scanning position.

11. The method of performing the Point From Focus (PFF) measurement according to claim 6, wherein the interpolation image is generated by a brightness value below:

$$I_{ij}=\{(dZ_2-dZ_1)*I1_{ij}+dZ_1*I2_{ij}\}/dZ_2,$$

where $I_{ij}$ represents the brightness value of the interpolation image, $dZ_1$ represents a first Z coordinate value of the first scanning position, $dZ_2$ represents a second Z coordinate value of the second scanning position, $I1_{ij}$ represents a first brightness value at the first scanning position and $I2_{ij}$ represents a second brightness value at the second scanning position.

12. The method of performing the WLI measurement according to claim 7, wherein the interpolation image is generated by linear interpolation between the first raw image captured at the first scanning position and the second raw image captured at the second scanning position using a first Z coordinate value of the first scanning position, a second Z coordinate value of the second scanning position, a first brightness value at the first scanning position and a second brightness value at the second scanning position.

13. The method of performing the WLI measurement according to claim 7, wherein the interpolation image is generated by a brightness value below:

$$I_{ij}=\{(dZ_2-dZ_1)*I1_{ij}+dZ_1*I2_{ij}\}/dZ_2,$$

where $I_{ij}$ represents the brightness value of the interpolation image, $dZ_1$ represents a first Z coordinate value of the first scanning position, $dZ_2$ represents a second Z coordinate value of the second scanning position, $I1_{ij}$ represents a first brightness value at the first scanning position and $I2_{ij}$ represents a second brightness value at the second scanning position.

* * * * *